(12) United States Patent
Saha et al.

(10) Patent No.: US 8,406,156 B2
(45) Date of Patent: Mar. 26, 2013

(54) COMPOSITE VOICE APPLICATIONS AND SERVICES USING SINGLE SIGN-ON ACROSS HETEROGENEOUS VOICE SERVERS

(75) Inventors: Debanjan Saha, Mohegan Lake, NY (US); Zon-Yin Shae, South Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 1363 days.

(21) Appl. No.: 12/114,092

(22) Filed: May 2, 2008

(65) Prior Publication Data

US 2008/0205604 A1   Aug. 28, 2008

Related U.S. Application Data

(63) Continuation of application No. 10/992,821, filed on Nov. 19, 2004, now abandoned.

(51) Int. Cl.
*H04L 12/16* (2006.01)

(52) U.S. Cl. ............... 370/260; 379/88.18; 379/202.01; 726/8

(58) Field of Classification Search .......... 370/260–269; 379/88.18, 158, 202.01, 203.01, 204.01, 379/205.01; 726/2–21
See application file for complete search history.

(56) References Cited

U.S. PATENT DOCUMENTS

| | | | | |
|---|---|---|---|---|
| 5,524,110 | A * | 6/1996 | Danneels et al. | ............. 370/260 |
| 6,064,666 | A | 5/2000 | Willner et al. | |
| 6,731,609 | B1 * | 5/2004 | Hirni et al. | ..................... 370/260 |
| 6,798,753 | B1 * | 9/2004 | Doganata et al. | ............. 370/260 |
| 7,050,422 | B2 | 5/2006 | Xu et al. | |
| 7,444,139 | B1 | 10/2008 | Welch et al. | |
| 7,474,634 | B1 * | 1/2009 | Webster et al. | ................ 370/261 |
| 7,826,603 | B1 * | 11/2010 | Denman et al. | .......... 379/202.01 |
| 2002/0059531 | A1 | 5/2002 | Lai On | |
| 2002/0172341 | A1 * | 11/2002 | Wellner et al. | ........... 379/202.01 |
| 2003/0108002 | A1 * | 6/2003 | Chaney et al. | ................ 370/261 |
| 2003/0115341 | A1 | 6/2003 | Sinha et al. | |
| 2005/0094579 | A1 * | 5/2005 | Acharya et al. | ................ 370/260 |
| 2006/0106929 | A1 | 5/2006 | Kenoyer et al. | |
| 2006/0109837 | A1 | 5/2006 | Saha et al. | |
| 2007/0245411 | A1 * | 10/2007 | Newton | ............................ 726/8 |
| 2009/0235329 | A1 * | 9/2009 | Chavez et al. | ..................... 726/3 |
| 2011/0138453 | A1 * | 6/2011 | Verma et al. | ....................... 726/8 |

OTHER PUBLICATIONS

Saha, et al., "Composite Voice Applications and Services Using Single Sign-On Across Heterogeneous Voice Servers," U.S. Appl. No. 10/992,821, filed Nov. 19, 2004, 27 pages.

Notice of Allowance, U.S. Appl. No. 10/992,821, Apr. 7, 2009, 7 pages.

* cited by examiner

*Primary Examiner* — Jeffrey M Rutkowski
(74) *Attorney, Agent, or Firm* — Yee & Associates, P.C.; Louis Percello (57) ABSTRACT

A framework is provided to offer composite voice applications and services. A composite application and service begins from the user dialing in via phone and ends by the user hanging up the phone. The composite interactive voice services architecture includes a session initiation protocol session service unit is in the loop of session signaling all the time starting from the time the user first dials in, during the user roaming across various voice servers, and until the end of the composite service when user hangs up the phone. This unit accepts a command and login instruction of the next interactive voice service from the previous interactive voice service. The unit has knowledge of DTMF sequences required for the user to login to next interactive voice service. The session service unit automatically accomplishes a roaming process such that composite applications and services can be achieved across various voice servers.

16 Claims, 6 Drawing Sheets

COMPOSITE VOICE APPLICATIONS AND SERVICES USING SINGLE SIGN-ON ACROSS HETEROGENEOUS VOICE SERVERS

This application is a continuation of application Ser. No. 10/992,821, filed Nov. 19, 2004, status abandoned.

BACKGROUND OF THE INVENTION

1. Technical Field

The present invention relates to data processing and, in particular, to interactive voice services. Still more particularly, the present invention provides a method, apparatus, and computer program product for providing composite voice applications and services using single sign-on across heterogeneous voice servers.

2. Description of Related Art

Interactive voice servers (IVS) are services that can be accessed from all phone devices by a public switched telephone network (PSTN) or voice over Internet protocol (VoIP) Internet (wired or wireless). In general, these servers interact with users only by voice and dual tone multi frequency (DTMF) signals, also known as touchtone signals, or equivalent. This is especially important for mobile users that can access the services by cell phones to perform critical business functions while away from the office, for example.

It is generally required for users to type in a user identification (ID) and/or a passcode by pushing the phone's keypad to log in an IVS after dialing in to the service. The passcode may be transported to the IVS via DTMF industrial standard. Consequently, every time a user dials into a different voice server, the user must go through the DTMF login process again. Currently, an IVS only provides services accessible from its own server, and cannot provide access to the services provided by another IVS.

As a result, each user must remember a user ID and passcode for each service. Furthermore, the user must dial into each service separately and perform a DTMF sequence to log into each service. This results in an inconvenience for users who wish to access several services, especially when the user accesses these services within a short period of time. There is added frustration when the services are somewhat related to one another and the user must remember information gained from one service to perform a task with another service.

SUMMARY OF THE INVENTION

The present invention recognizes the disadvantages of the prior art and provides a framework to provide composite voice applications and services. A composite application and service begins from the user dialing in via phone and ends by the user hanging up the phone. During this process, users will be able to access an integrated and much more powerful voice services in a user controllable sequence from multiple interactive voice servers. In this architecture, the control signal to establish session is separated from the voice data path for scalability. The composite interactive voice services architecture includes a session initiation protocol session service unit is in the loop of session signaling all the time starting from the time the user first dials in, during the user roaming across various voice servers, and until the end of the composite service when user hangs up the phone. This unit accepts a command and login instruction of the next interactive voice service from the previous interactive voice service. The unit has knowledge of DTMF sequences required for the user to login to next interactive voice service. The session service unit automatically accomplishes a roaming process such that composite applications and services can be achieved across various voice servers.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
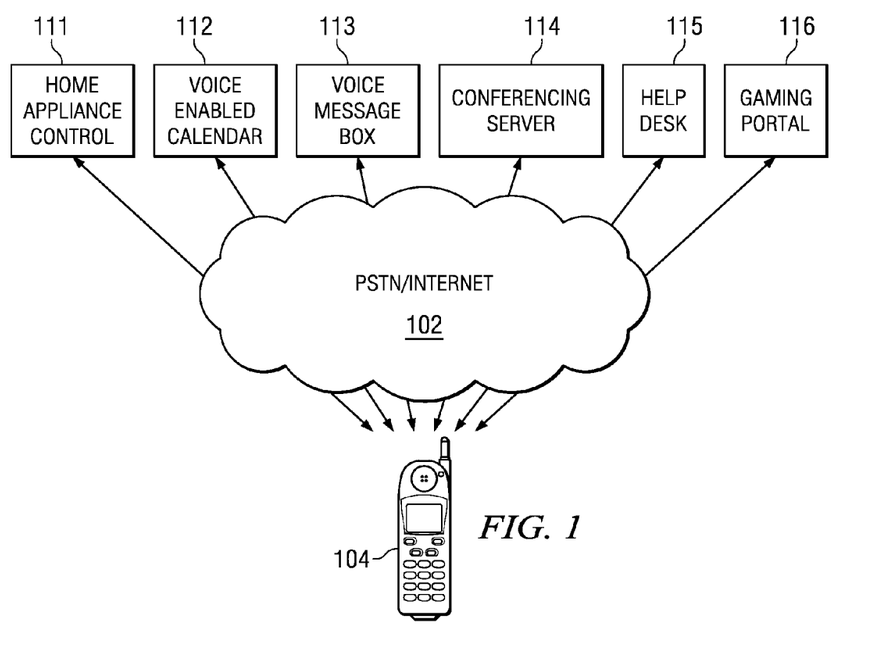
FIG. 1 illustrates an example interactive voice services environment in which exemplary aspects of the present invention may be implemented.

Interactive voice servers (IVS) are very services that can be accessed from telephone devices by a public switch telephone network (PSTN) or voice over Internet Protocol (VoIP) connection. FIG. 1 illustrates an example interactive voice services environment in which exemplary aspects of the present invention may be implemented. In general, these servers interact with users only by voice and dual tone multi frequency (DTMF) signals or equivalent. This is especially important for mobile users that access the services by cellular telephones.

In the example shown in FIG. 1, a user of telephone device 104 accesses interactive voice services through PSTN/Internet infrastructure 102. The interactive voice services may include, for example, home appliance control 111, voice enabled calendar 112, voice message box 113, conferencing server 114, help desk 115, and gaming portal 116. However, more or fewer interactive voice services and various other services may be available through PSTN/Internet infrastructure 102. It is generally required for users to type in a user ID and/or passcode by pushing buttons on a keypad to log into an IVS right after dial-in. The passcode is transported to IVS via DTMF signals or equivalent. Consequently, in current systems, every time a user dials into a different voice server, the user must go through the DTMF login process again. An IVS currently only provides services accessible from its own server and cannot provide access to services that provided by another IVS.

In most interactive voice applications, it is required for users to roam and compose the individual services from more than one IVS. In these cases, users are asked to type in a passcode again for each service, potentially causing the user to remember and enter a different passcode for each service. In accordance with a preferred embodiment of the present invention, a framework is provided, which allows composite applications and services. A composite application or service begins from the user dialing in via a telephone device and ends by the user hanging up the telephone device. During this process, users are able to access integrated and much more powerful voice services in a user controllable sequence from multiple IVSs. In this framework, the control signal to establish session is separated from the voice data path for the scalability.

Figure 2:
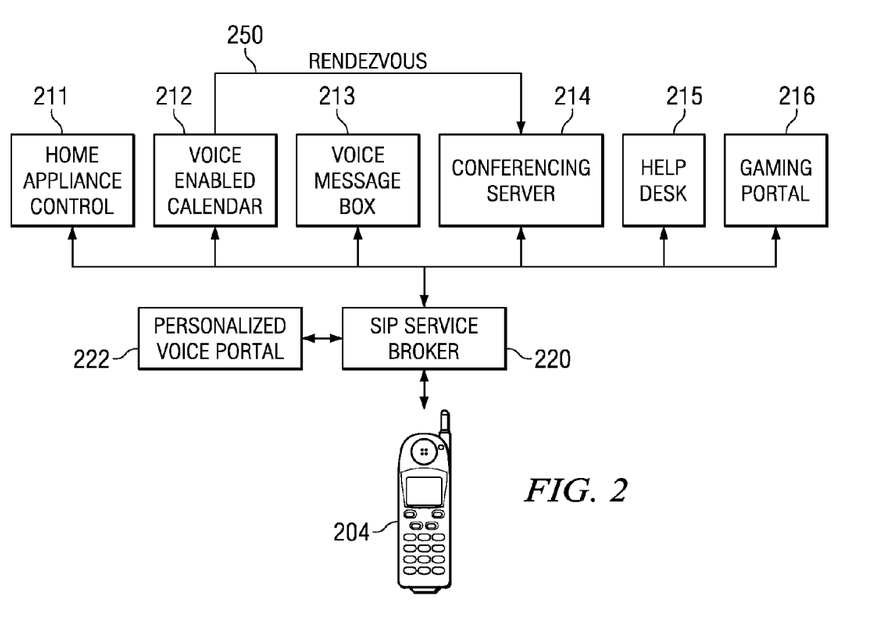
FIG. 2 is a block diagram illustrating a framework for composite applications and services in accordance with an exemplary embodiment of the present invention.

FIG. 2 is a block diagram illustrating a framework for composite applications and services in accordance with an exemplary embodiment of the present invention. A user of telephone device 204 accesses interactive voice services through session initiation protocol (SIP) service broker 220. SIP is an Internet protocol (IP) telephony signaling protocol that is primarily used for voice over IP calls, although SIP can also be used for video or any media type. SIP is a text-based protocol that is based on hypertext transport protocol (HTTP) and multipurpose Internet mail extensions (MIME), which makes it suitable and very flexible for integrated voice-data applications. The interactive voice services may include, for example, home appliance control 111, voice enabled calendar 112, voice message box 113, conferencing server 114, help desk 115, and gaming portal 116. However, more or fewer interactive voice services and various other services may be available through SIP service broker 220.

SIP service broker 220 is in the loop of SIP session signaling all the time starting when the user first dials in, during the user roaming across various voice servers, and until the end of the composite service when user hang up telephone device 204. SIP service broker 220 accepts the command and log-in instruction of the next IVS from the previous IVS. SIP service broker 220 has knowledge of the DTMF sequences required for the user to login to next IVS. SIP service broker 220 then accomplishes a roaming process from one IVS to another such that a composite application or service is achieved across various voice servers.

SIP service broker 220 provides a single service entry point with personalized interactive voice selection. Personalized voice portal 222 is an IVS that provides access to other interactive voice services. Personalized voice portal 222 stores the user ID and passcode information for each IVS that the user will access. For example, the user of telephone device 204 logs into SIP service broker 220, which initially provides access to personalized voice portal 222. When the user first access personalized voice portal 222, the user enters a user ID and/or passcode using DTMF signals or equivalent. Personalized voice portal 222 then authenticates the user ID or passcode and performs an interactive service that allows the user to access other IVSs.

In a particular example, the user of telephone device 204 may indicate that she wishes to access voice enabled calendar 212. SIP service broker 220 then establishes a session with voice enables calendar 212 and performs the DTMF sequences to log the user into IVS 212. SIP service broker 220 then ends the session with personalized voice portal 222 and connects telephone device 204 to IVS 212. The user may then determine that she wishes to access conferencing server 214. SIP service broker than performs a rendezvous operation 250 to transfer the session from IVS 212 to IVS 214. After SIP service broker 220 performs rendezvous operation 250, telephone device 204 is connected to conferencing server 214. The details of the rendezvous operation will be described in further detail below.

The composite application and service framework of the present invention enables roaming among services across various interactive voice servers with only a single user dial-in session. Each IVS can provide links for the user to jump to external services, similar to the way Web pages provide links to jump to other Web pages in other Web servers. Each IVS can provide a default link to return to personalized voice portal 222. For example, when a user enters a "*0" DTMF signal, this may indicate that the user wishes to terminate the session with the current IVS and return to personalized voice portal 222. SIP service broker 220 may intercept every DTMF signal sent from telephone device 204 for navigation among interactive voice services. Enterprises or carriers may outsource individual voice service components and then combine these services to form a composite application or service. Similarly, individual voice service providers may team together to provide more powerful services or applications.

Figure 3:
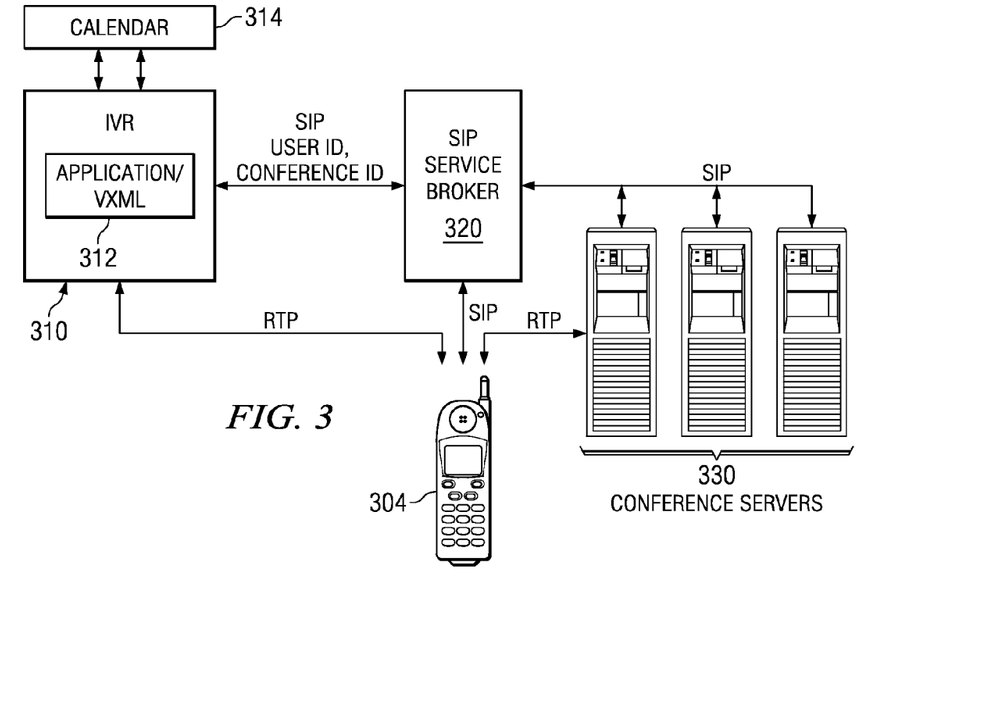
FIG. 3 illustrates an example composite interactive voice service in accordance with a preferred embodiment of the present invention.

FIG. 3 illustrates an example composite interactive voice service in accordance with a preferred embodiment of the present invention. In this example, a first IVS is an interactive voice response (IVR) service 310 that allows a user to access calendar 314 through an application 312 for meeting entries. Application 312 may be written in voice extensible markup language (VoiceXML or VXML). VXML is an extension to extensible markup language (XML) that defines voice segments and enables access to the Internet via telephones and other voice-activated devices. A second IVS is a set of conference servers 330 that provide a conference service but require the user to provide a DTMF conference passcode to enter.

The user first dials into SIP service broker 320 using telephone device 304 to establish a SIP session between telephone device 304 and SIP service broker 320. The user may log into the SIP service broker using a user ID and/or passcode within the SIP session. The user may then instruct SIP service broker 320 to establish a session with IVR 310. SIP service broker 320 then establishes a SIP session between SIP service broker 320 and IVR 310. In the SIP session, SIP service broker 320 logs into IVR 310 using a user ID and/or passcode on behalf of the user.

When the login is complete, SIP service broker 320 instructs IVR 310 to establish a realtime transport protocol (RTP) session between telephone device 304 and IVR 310. RTP is an Internet protocol (IP) that supports realtime transmission of voice and video. RTP is widely used for IP telephony and video streaming. An RTP packet rides on top of user datagram protocol (UDP) and includes timestamp and synchronization information in its header for proper reassembly at the receiving end. UDP is a protocol within the TCP/IP protocol suite that is used in place of TCP when a reliable delivery is not required, as is the case with Internet telephony and other realtime transmissions, for instance. UDP is widely used for realtime audio and video traffic where lost packets are simply ignored, because there is no time to retransmit. The user may then use telephone device 304 to access calendar 312 using application/VXML 312 via the RTP session with IVR 310.

While the user accesses calendar 312, the user may discover that a telephone conference is scheduled using the second IVS. Therefore, the user must establish a communications session with one of conference servers 330. IVR 310 may be modified to provide a link to jump to the second IVS. Thus, the user may enter a button sequence using telephone device 304 to instruct IVR 310 to transfer the session to the second IVS. IVR 310 then sends the user ID and conference ID for the session with conference servers 330 through its SIP session with SIP service broker 320. Service broker 320 then establishes a SIP session with one or more of conference servers 330. In the SIP session, SIP service broker 320 logs into one or more of conference servers 330 using the user ID and conference ID on behalf of the user. When the login is complete, SIP service broker 320 instructs conference servers 330 to establish a RTP session between telephone device 304 and conference servers 330. The user may then access the service provided by conference servers 330 without having to dial separate numbers and perform multiple logins. The end composite service is very powerful enterprise application. A user may dial in to find out about current meeting and then join the conference automatically.

Figure 4:
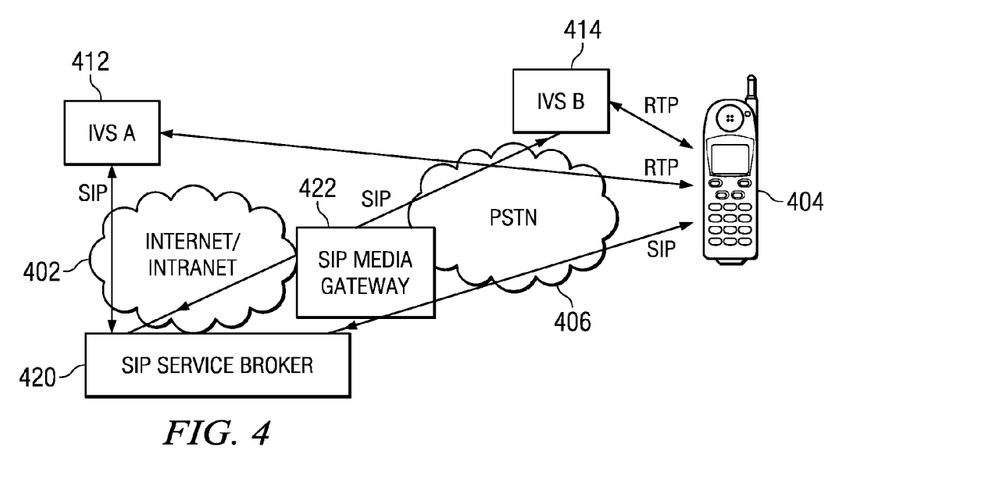
FIG. 4 illustrates a session initiation protocol infrastructure in accordance with an exemplary embodiment of the present invention.

FIG. 4 illustrates a session initiation protocol infrastructure in accordance with an exemplary embodiment of the present invention. In order to access the composite service, a user of telephone device 404 dials into SIP service broker unit 420, which itself can be reached globally using a pre-specified telephone number. Telephone device 404 communicates with SIP service broker 420 either by dynamically SIP registration to SIP register server or by static dial plan configuration in the SIP infrastructure. The unit in turn dials in to IVS A 412 on behalf of the user. As a result, SIP service broker unit 420 will have two SIP control sessions, one to IVS A 412, and the other to user 404.

IVS A 412 then establishes an RTP session with telephone device 404. The RTP session directs flow of voice packets between telephone device 404 and IVS A 412 for scalability. SIP service broker unit 420 is not in the voice data path. This increases the scalability of the architecture.

User 404 may access the voice services provided by this IVS A 412 at this point. There are a few ways that the user can navigate and roam the services among the IVSs. First, each IVS may provide links for users to jump to external services similar to the manner in which web pages provide links to jump to other web pages in other web servers. As another example, each IVS may provides a "default link" to jump back to the default personalized voice portal. For example, whenever a user pushes a "*0" DTMF signal, this may instruct the IVS to terminate the session and return to the personalized voice portal. As yet another example, SIP service broker unit 420 may intercept every DTMF signal sent from the user for navigation.

DTMF signals may only be sent after the call session is connected. After the session between IVS A 412 and telephone device 404 is established, the user may follow voice response instructions to enter a user ID and/or password from the key pad of telephone device 404. This creates a DTMF sequence from phone 404 to IVS A 412 via the RTP path. If the password accepted, then the user may access the services provided by IVS A 412 by voice through the RTP path. IVS A 412 may provide links for allowing the user to jump to other IVSs to continue the composite services. The link might provide the phone number of the next IVS, such as IVS B 414, the required DTMF sequences, or the desired service ID. If only desired service ID is available, SIP service broker unit 420 may optimally allocate an IVS server to dial in for the services.

Telephone device 404 may communicate with SIP service broker 420, IVS A 412, and/or IVS B 414 using public switch telephone network 406 or Internet/intranet 402. SIP service broker 420 may communicate with IVS A 412 and/or IVS B 414 using Internet/intranet 402, although, alternatively, SIP service broker 420 may also communicate with IVSs through PSTN 406. An SIP media gateway is a gateway between PSTN signaling and the IP world. SIP media gateway 422 converts protocols and data signals between PSTN and SIP such that SIP devices in the IP world can communicate with phone devices in PSTN world.

Figure 5:
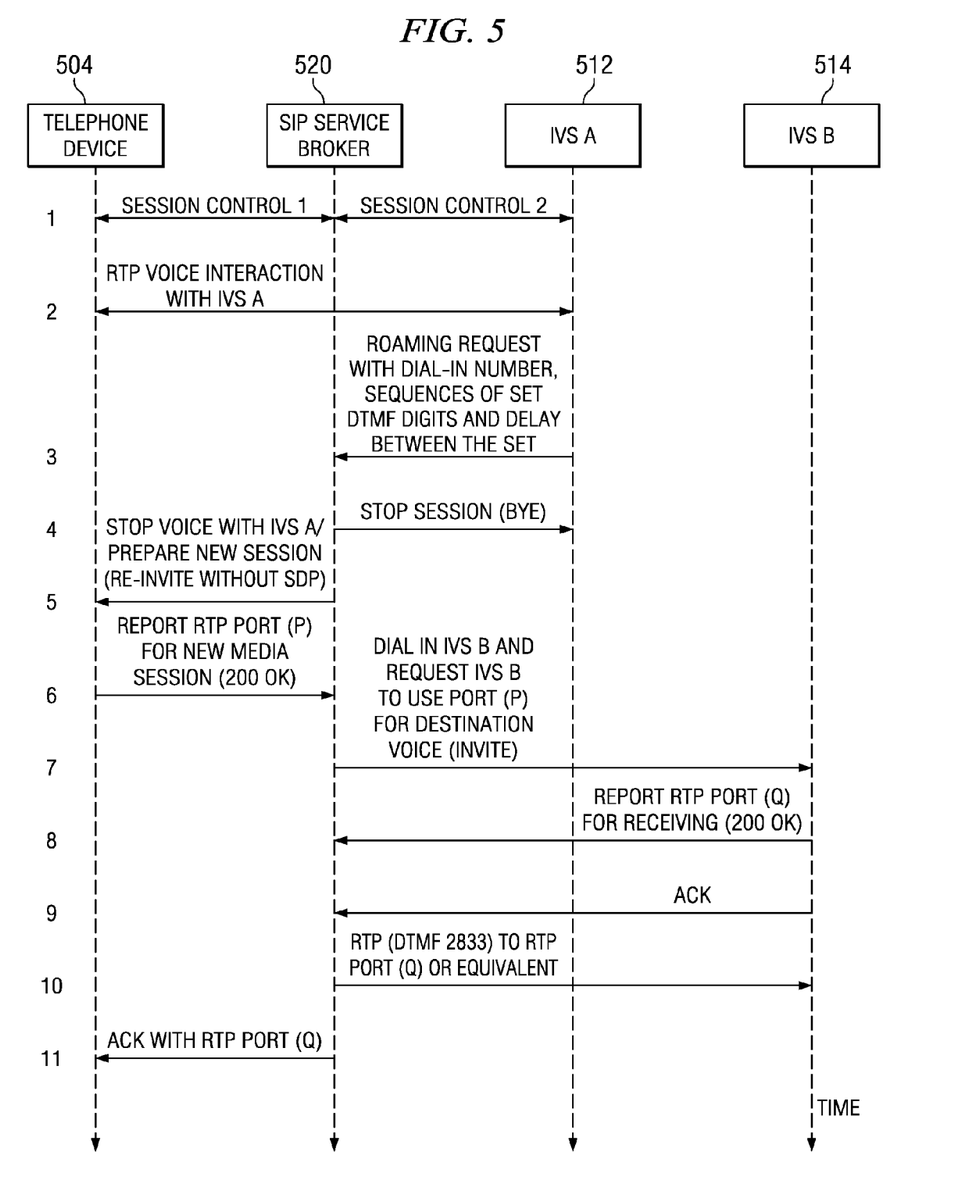
FIG. 5 is an example timing diagram illustrating a single sign on between two interactive voice services in accordance with a preferred embodiment of the present invention.

FIG. 5 is an example timing diagram illustrating a single sign on between two interactive voice services in accordance with a preferred embodiment of the present invention. When the user of telephone device 504 dials in and accesses ISV A 512, SIP service broker 520 establishes session control 1 with telephone device 504 and establishes session control 2 with IVS A 512 (step 1). Telephone device 504 establishes RTP voice interaction with IVS A 512 (step 2).

When the user requests an external service link, ISV A 512 sends the link parameters to SIP service broker 520 to indicate the user's service request (step 3). SIP service broker 520 terminates the ISV A session by sending a "BYE" signal (step 4). SIP service broker 520 then stops the user's old RTP session and request and prepares a new RTP session by sending a RE-INVITE without session description protocol (SDP) (step 5). SDP describes the media to be used in the SIP session.

Telephone device 504 reports its RTP port for the new session (step 6). SIP service broker 520 then dials in IVS B 514 and reports the new RTP port by INVITE (step 7). IVS B 514 report its RTP port for the session (step 8). SIP service broker 520 sends an acknowledgement (ACK) to IVS B 514 to complete the call leg for IVS B 514 (step 9).

Note that, at this moment, the second call leg has completed, but not the first call leg. Thus, telephone device 504 will not start sending RTP packets. This is important because, if telephone device 504 starts to send RTP packets, it will corrupt the DTMF sequences due to the continuity requirements of RTP packet sequences. SIP service broker 520 then sends required DTMF sequences to automatically login to IVS B 514 (step 10). SIP service broker 520 then completes the call first leg and enable telephone device 504 to send RTP packets by sending ACK (step 11). If an IVS supports login by SIP control signaling, SIP service broker 520 can also use the corresponding SIP signaling to login that IVS.

FIGS. 6A-6F are block diagrams illustrating an example bridge-and-roll operation in accordance with a preferred embodiment of the present invention. More particularly, with reference to FIG. 6A, a user of telephone device 604 connects to IVS A 612 by establishing a connection with public branch exchange (PBX)/SIP gateway 610 using time division multiplexing (TDM). TDM is technology that transmits multiple signals simultaneously over a single transmission path. Each lower-speed signal is time sliced into one high-speed transmission. For example, three incoming 1,000 bps signals can be interleaved into one 3,000 bps signal. The receiving end divides the single stream back into its original signals. SIP service broker 620 then establishes a SIP connection with telephone device 604 and with IVS A 612 and then establishes an RTP session between telephone device 604 and IVS A 612.

Figure 6A:
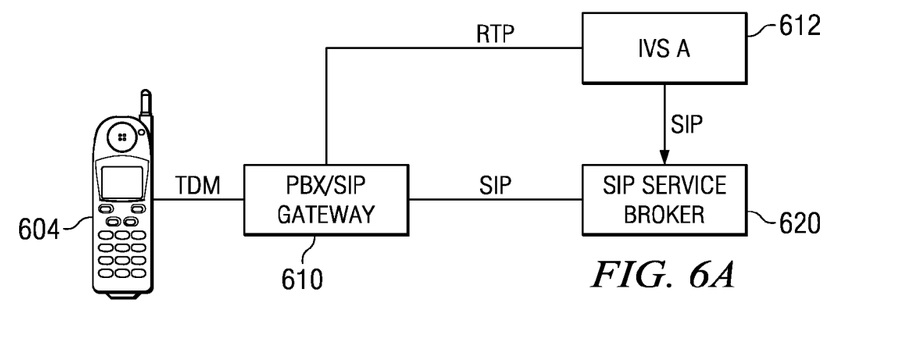
FIGS. 6A-6F are block diagrams illustrating an example bridge-and-roll operation in accordance with a preferred embodiment of the present invention.
Figure 6B:
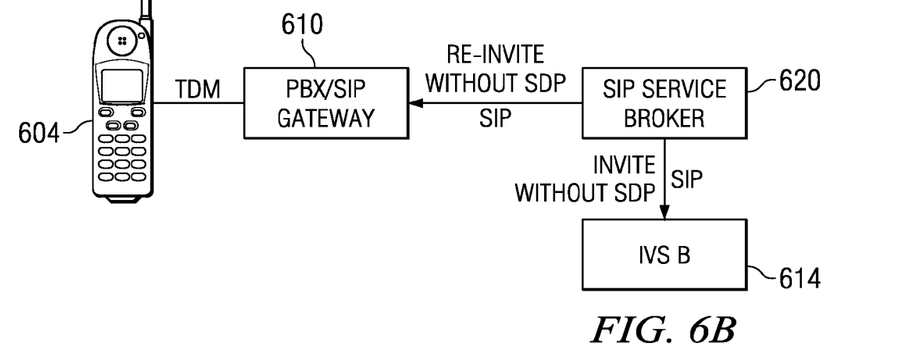
Figure 6C:
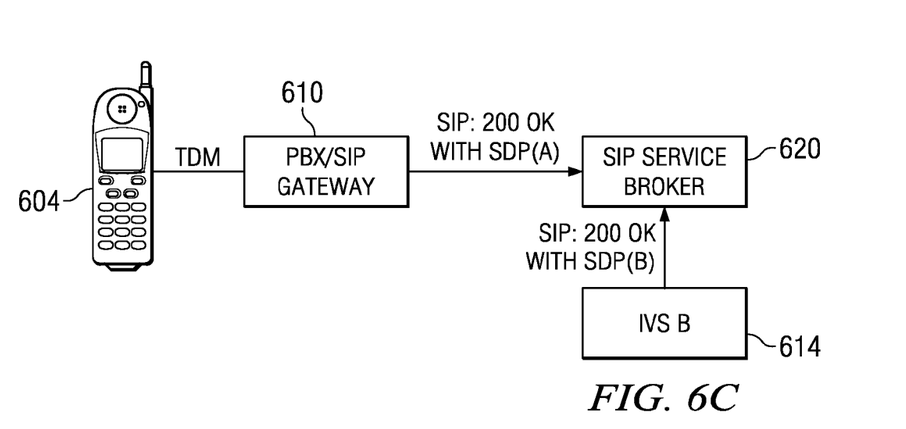

With reference to FIG. 6B, SIP service broker 620 establishes a SIP connection with IVS B 614 and prepares a new RTP session by sending an INVITE without SDP to IVS 614 and sending a RE-INVITE without SDP to PBX/SIP gateway 610. This disconnects the first session, forms a second connection to IVS B 614, and terminates and cleans up the RTP residue in PBX/SIP gateway 610. Turning to FIG. 6C, PBX/SIP gateway 610 sends a "200 OK" signal with SDP(A) to SIP service broker 620. This is to tell the SIP service broker 620 the media connection properties described in SDP that PBX/SIP gateway 610 would like to use for this SIP session. IVS B 614 sends a "200 OK" signal with SDP(B) to SIP service broker 620. This is to tell SIP service broker 620 the media connection properties described in SDP that IVS B 614 would like to use for this SIP session.

Figure 6D:
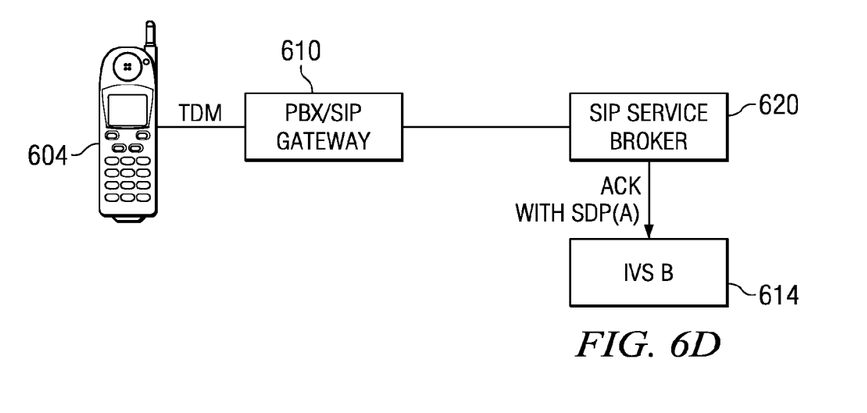
Figure 6E:
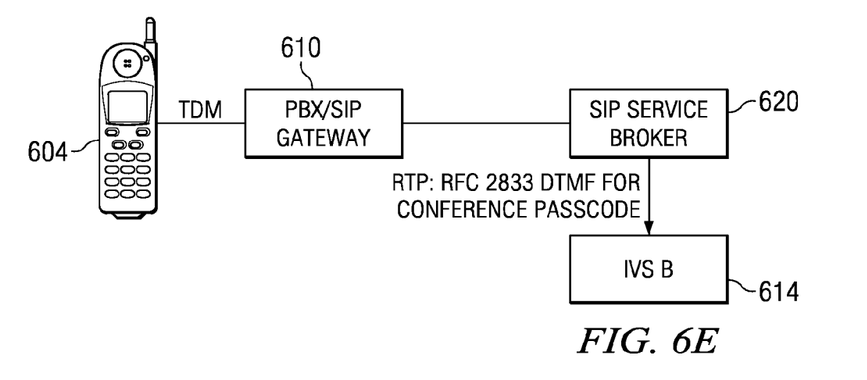
Figure 6F:
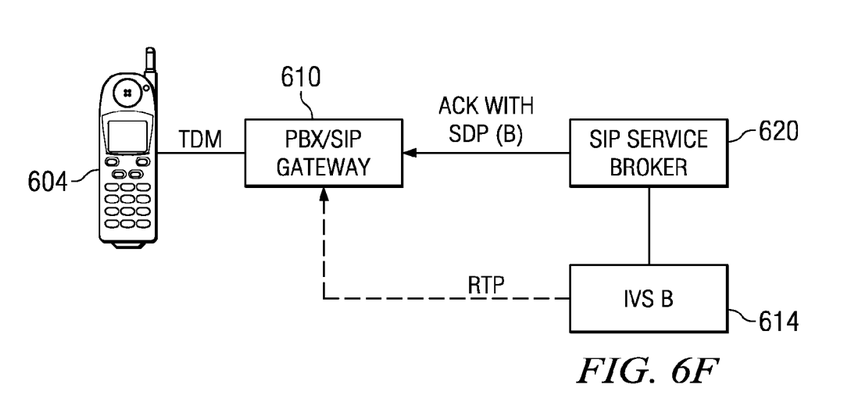

With reference now to FIG. 6D, SIP service broker 620 sends an ACK to IVS B 614 to create the RTP session. Next, with reference to FIG. 6E, SIP service broker 620 sends a passcode to log on to IVS B 614. Thereafter, as shown in FIG. 6F, SIP service broker 620 sends ACK to PBX/SIP gateway 610 to create the RTP session from the gateway and to direct the RTP session to the RTP port of IVS B 614.

Figure 7:
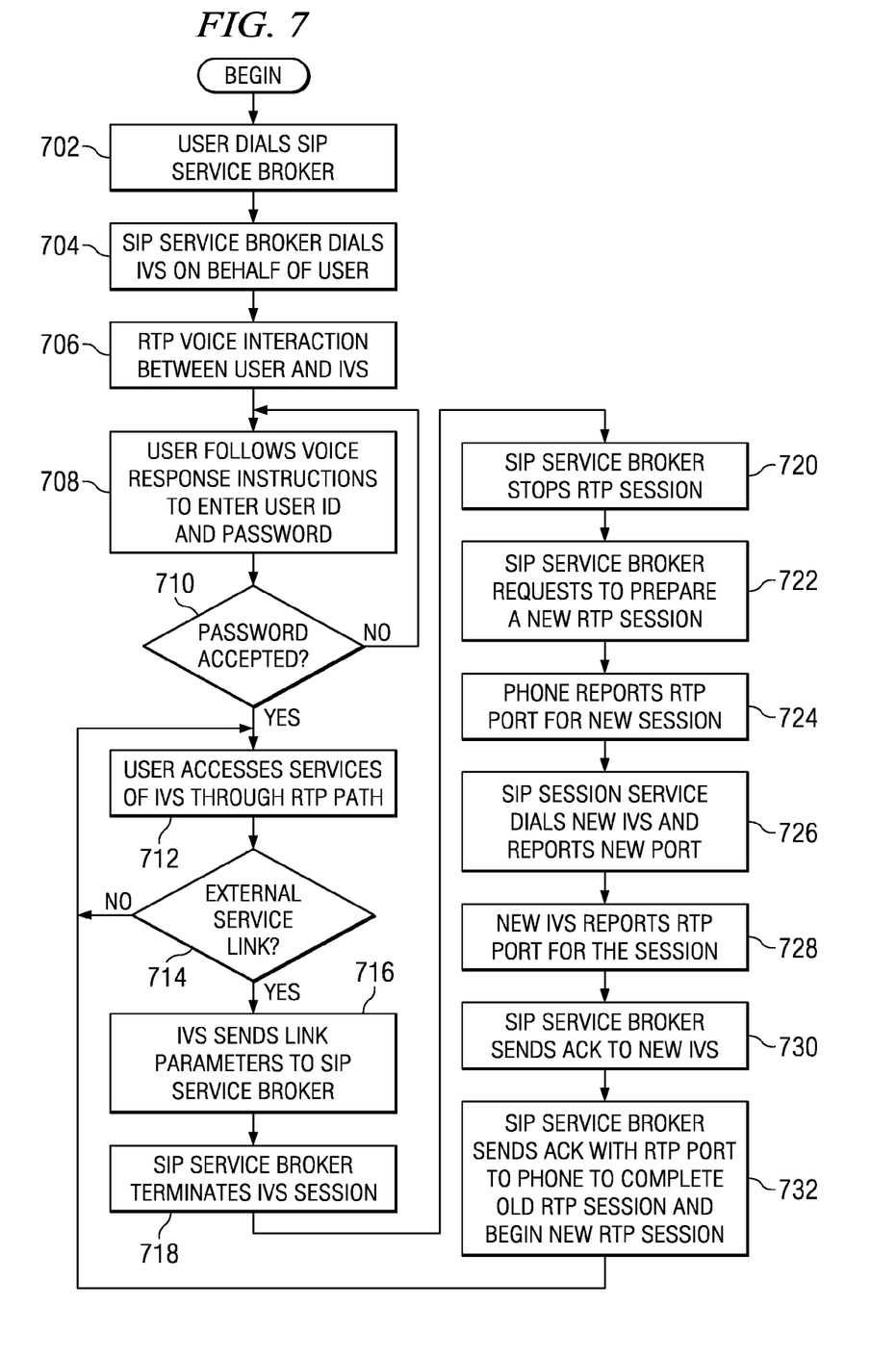
FIG. 7 is a flowchart illustrating the operation of a framework for composite applications and services in accordance with an exemplary embodiment of the present invention.

FIG. 7 is a flowchart illustrating the operation of a framework for composite applications and services in accordance with an exemplary embodiment of the present invention. Operation begins and the user dials into the SIP service broker (block 702). Then, the SIP service broker dials the IVS on behalf of the user (block 704) and establishes a connection for RTP voice interaction between the user and the IVS (block 706). Next, the user follows voice response instructions to enter a user ID and/or password (block 708). The IVS determines whether the password is accepted (block 710). If the password is not accepted, operation returns to block 708.

If the password is accepted in block 710, the user accesses services of the IVS through the RTP path (block 712). The IVS determines whether the user activates an external service link (block 714). If the user does not activate an external service link, operation returns to block 712. If, however, the user does activate an external service link, the IVS sends the link parameters to the SIP service broker (block 716). The SIP service broker then terminates the IVS session (block 718), stops the RTP session (block 720), and requests to prepare a new RTP session with the new IVS (block 722).

The telephone device reports the RTP port for the new RTP session (block 724). The SIP service broker then dials the new IVS and reports the new RTP port to the new IVS (block 726). The new IVS reports the RTP port for the session (block 728) and the SIP service broker sends an acknowledgement to the new IVS (block 730). Thereafter, the SIP service broker sends an acknowledgement with the RTP port of the new IVS to the telephone device to complete the old RTP session and to begin the new RTP session (block 732). Then, operation returns to block 712 to allow the user to access services of the new IVS through the newly established RTP session.

Thus, the present invention solves the disadvantages of the prior art by providing a framework to provide composite voice applications and services. A composite application and service begins from the user dialing in via phone and ends by the user hanging up the phone. During this process, users will be able to access an integrated and much more powerful voice services in a user controllable sequence from multiple interactive voice servers. In this architecture, the control signal to establish session is separated from the voice data path for scalability. The composite interactive voice services architecture includes a session initiation protocol session service unit is in the loop of session signaling all the time starting from the time the user first dials in, during the user roaming across various voice servers, and until the end of the composite service when user hangs up the phone. This unit accepts a command and login instruction of the next interactive voice service from the previous interactive voice service. The unit has knowledge of DTMF sequences required for the user to login to next interactive voice service. The session service unit automatically accomplishes a roaming process such that composite applications and services can be achieved across various voice servers.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for providing a composite service, the method comprising:
    establishing a first session between a telephone device and a first interactive voice service, wherein the first interactive voice service and a service broker communicate using a first session initiation protocol session;
    responsive to activation of an external link, establishing a connection between the service broker and a second interactive voice service, wherein the second interactive voice service and the service broker communicate using a second session initiation protocol session;
    automatically logging the telephone device into the second interactive voice service, wherein the automatically logging of the telephone device into the second interactive voice service includes sending login information from the service broker to the second interactive voice service using the second session initiation protocol session; and
    terminating the first session and establishing a second session between the telephone device and the second interactive voice service in response to the telephone device successfully logging into the second interactive voice service.

2. The method of claim 1, wherein the first session and the second session are realtime transport protocol sessions.

3. The method of claim 2, wherein terminating the first session and establishing the second session includes:
    reporting a first realtime transport protocol port from the telephone device to the service broker;
    sending the first realtime transport protocol port to the second interactive voice service;
    reporting a second realtime transport protocol port from the second interactive voice service to the service broker; and
    sending the second realtime transport protocol port to the telephone device.

4. The method of claim 1, further comprising:
    sending the login information for the telephone device and the second interactive voice service from the first interactive voice service to the service broker using the first session initiation protocol session.

5. The method of claim 4, wherein the login information includes at least one of a user identification and a passcode for the second interactive voice service.

6. The method of claim 4, wherein the login information includes parameters for accessing features of the second interactive voice service.

7. The method of claim 1, wherein the first interactive voice service is a personalized voice portal.

8. The method of claim 7, further comprising:
monitoring for activation of a default link; and
terminating the second session and establishing a third session between the telephone device and the personalized voice portal responsive to the telephone device activating the default link.

9. An apparatus for providing a composite service, the apparatus comprising:
a gateway device that converts protocols and data signals between a public switch telephone network and session initiation protocol; and
a service broker, wherein the service broker establishes a first session between a telephone device and a first interactive voice service, establishes a connection between the service broker and a second interactive voice service responsive to activation of an external link, automatically logs the telephone device into the second interactive voice service, terminates the first session, and establishes a second session between the telephone device and the second interactive voice service in response to the telephone device successfully logging into the second interactive voice service.

10. The apparatus of claim 9, wherein the first session and the second session are realtime transport protocol sessions.

11. The apparatus of claim 10, wherein the service broker terminates the first session and establishes the second session by reporting a first realtime transport protocol port from the telephone device to the service broker, sending the first realtime transport protocol port to the second interactive voice service, reporting a second realtime transport protocol port from the second interactive voice service to the service broker, and sending the second realtime transport protocol port to the telephone device.

12. The apparatus of claim 9, wherein the first interactive voice service and the service broker communicate using a first session initiation protocol session.

13. The apparatus of claim 12, wherein the service broker receives login information for the telephone device and the second interactive voice service from the first interactive voice service using the first session initiation protocol session.

14. The apparatus of claim 12, wherein the second interactive voice service and the service broker communicate using a second session initiation protocol session and wherein the service broker automatically logs the telephone device into the second interactive voice service by sending login information from the service broker to the second interactive voice service using the second session initiation protocol session.

15. The apparatus of claim 9, wherein the first interactive voice service is a personalized voice portal.

16. The apparatus of claim 15, wherein the service broker monitors for activation of a default link, terminates the second session, and establishes a third session between the telephone device and the personalized voice portal responsive to the telephone device activating the default link.

* * * * *